June 27, 1939.　　　J. C. WEAVER　　　2,163,741
GEAR SHIFTING MECHANISM
Filed Aug. 21, 1936　　　8 Sheets-Sheet 1
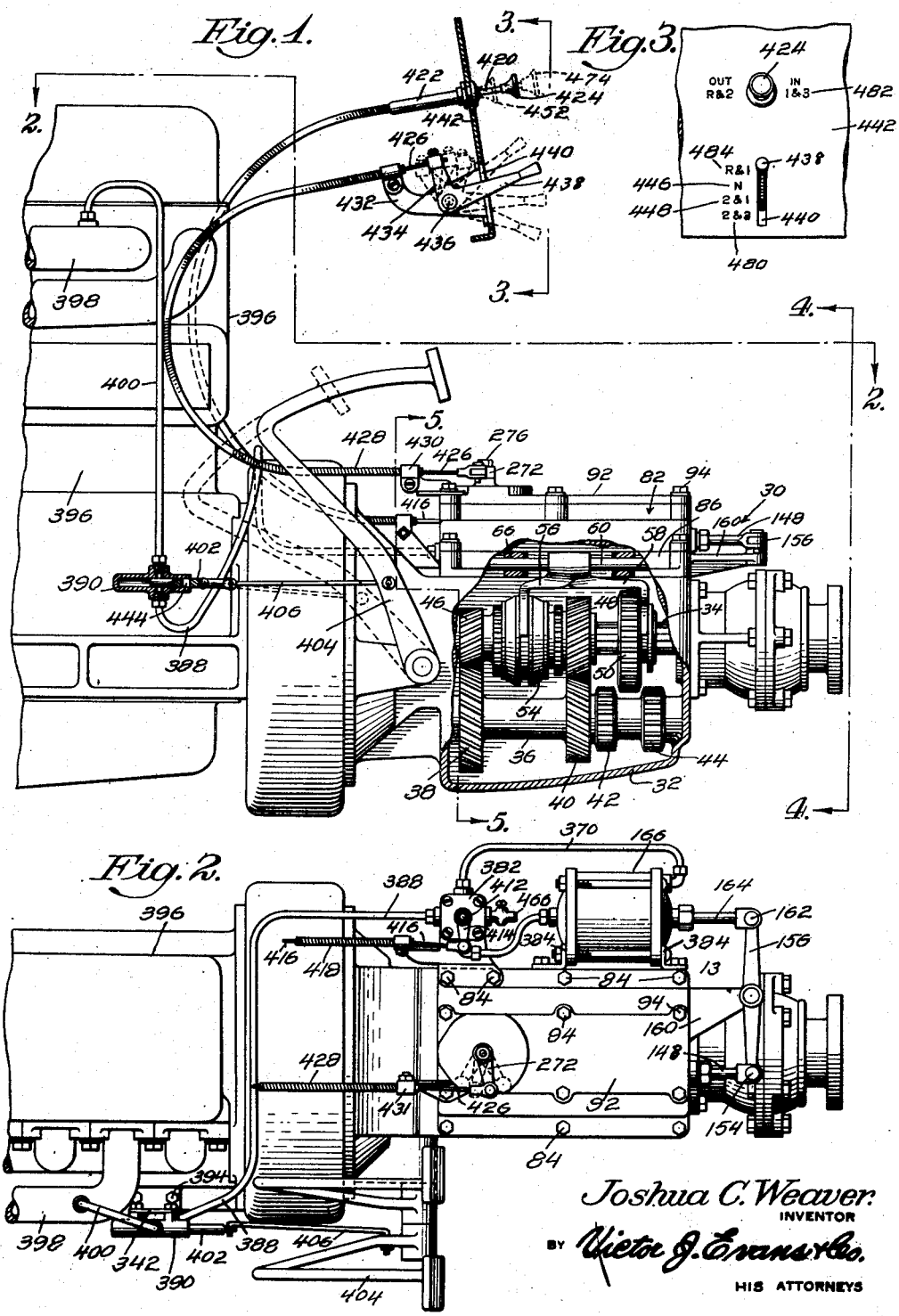
Joshua C. Weaver.
INVENTOR June 27, 1939.  J. C. WEAVER  2,163,741
GEAR SHIFTING MECHANISM
Filed Aug. 21, 1936  8 Sheets-Sheet 2
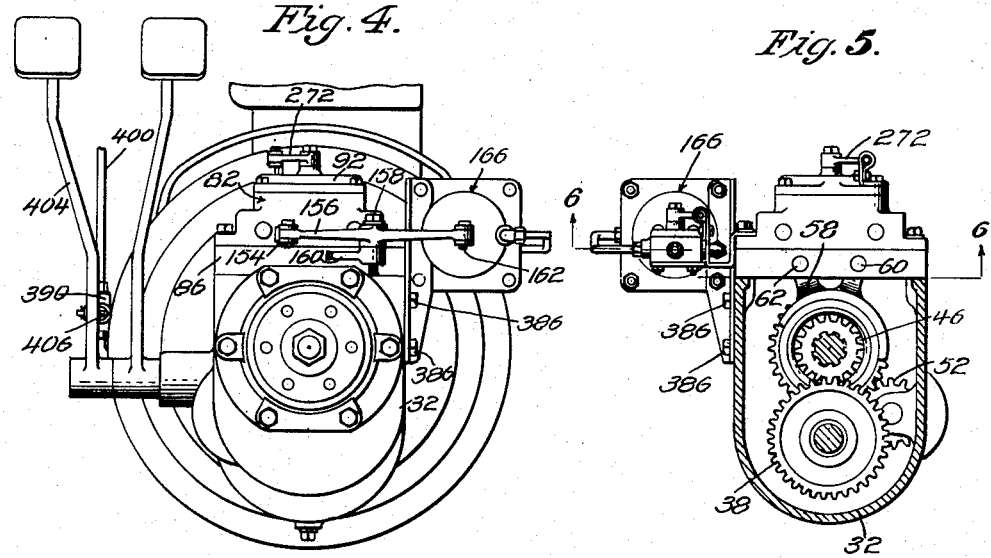
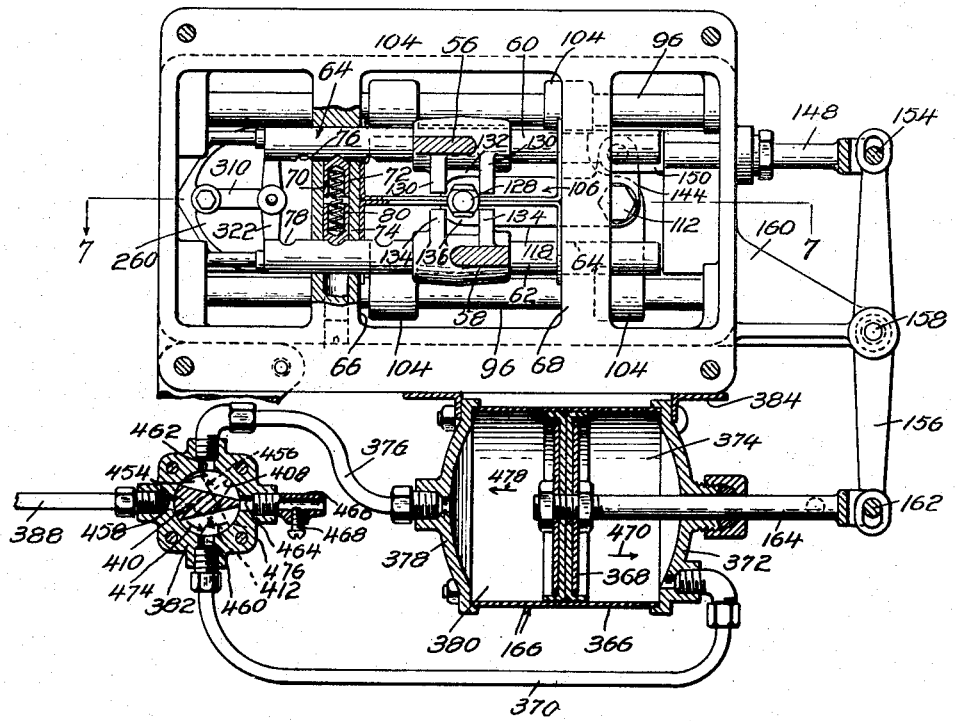
Joshua C. Weaver
INVENTOR
BY Victor J. Evans & Co.
HIS ATTORNEYS

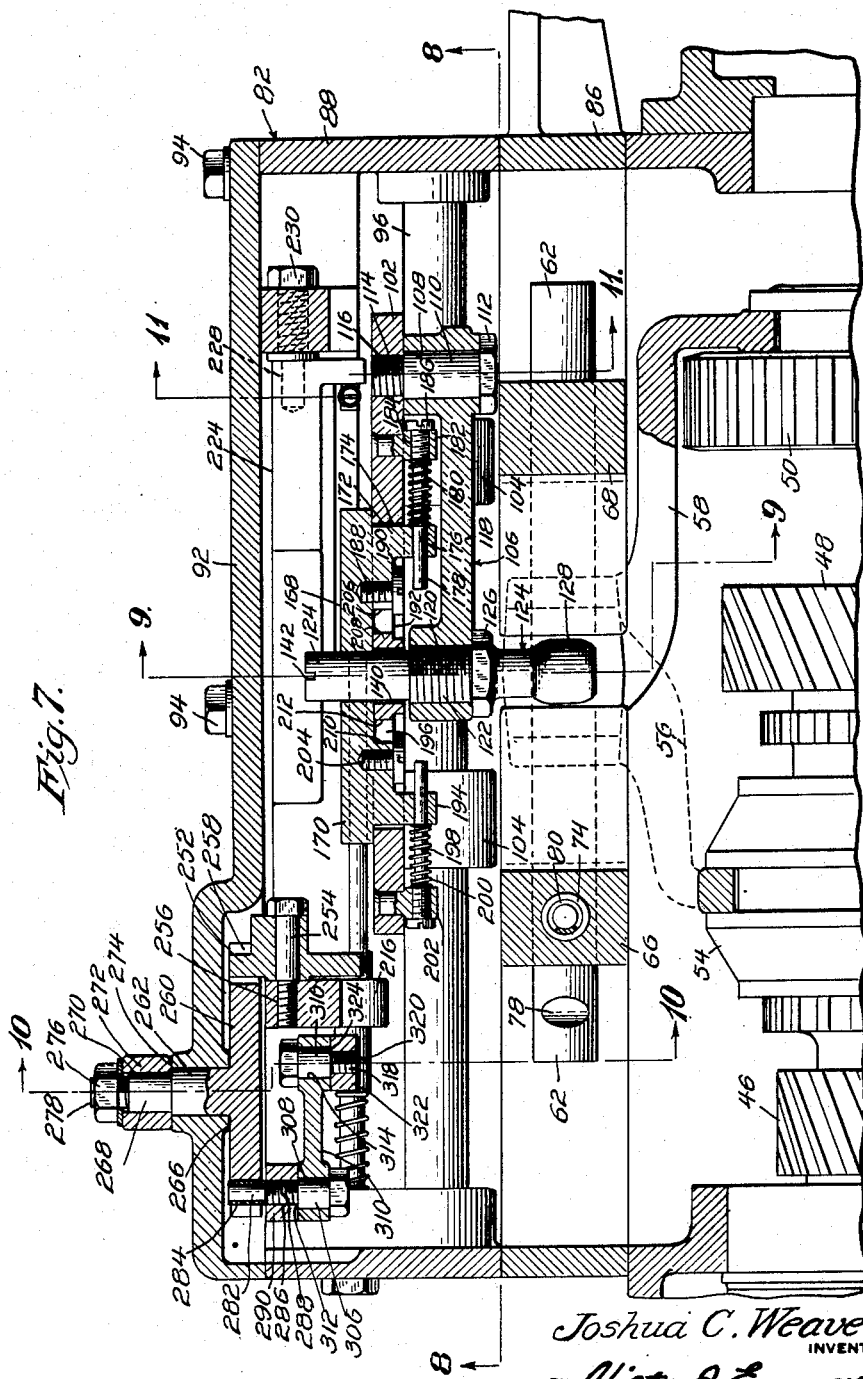

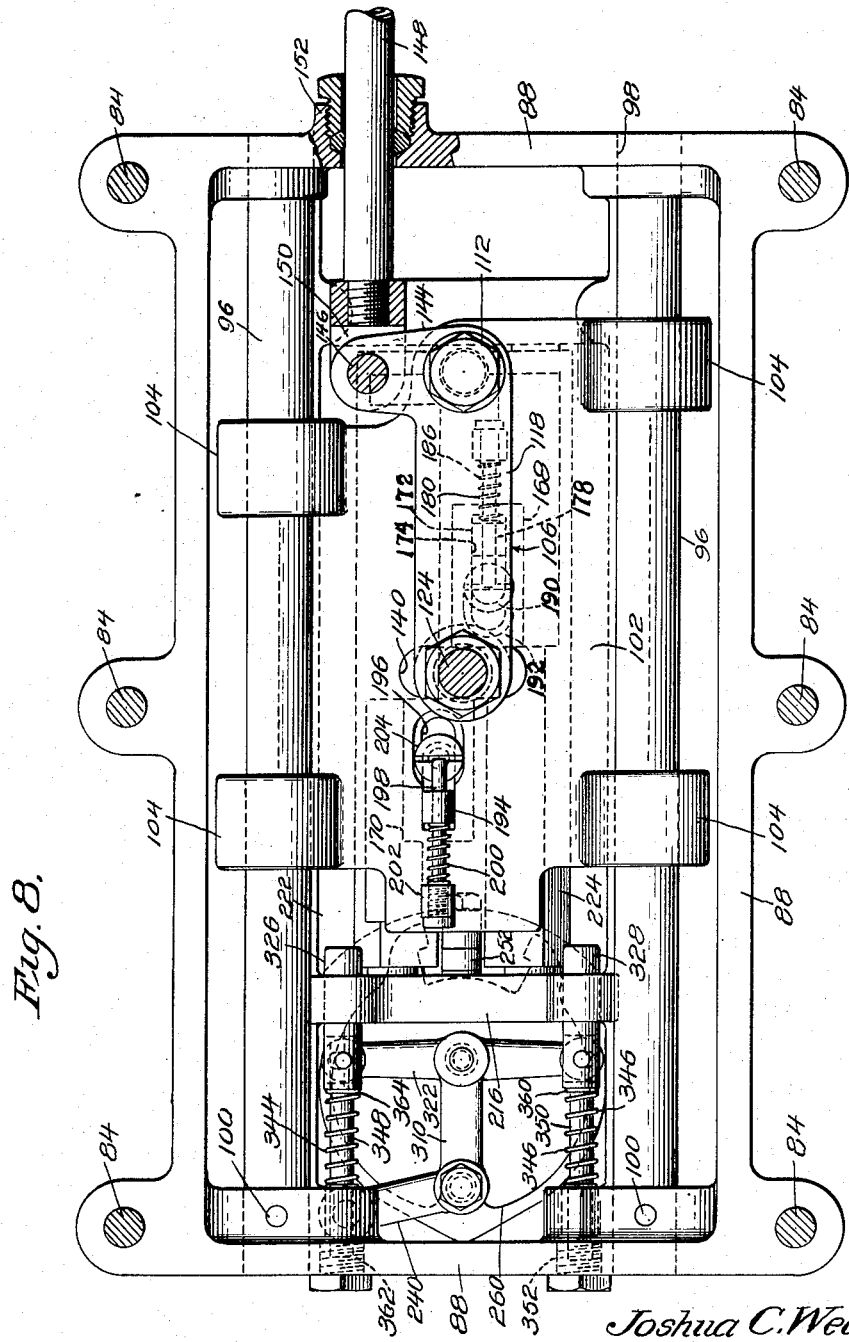

Joshua C Weaver.
INVENTOR
BY Victor J. Evans & Co.
HIS ATTORNEYS

June 27, 1939. J. C. WEAVER 2,163,741
GEAR SHIFTING MECHANISM
Filed Aug. 21, 1936 8 Sheets-Sheet 6
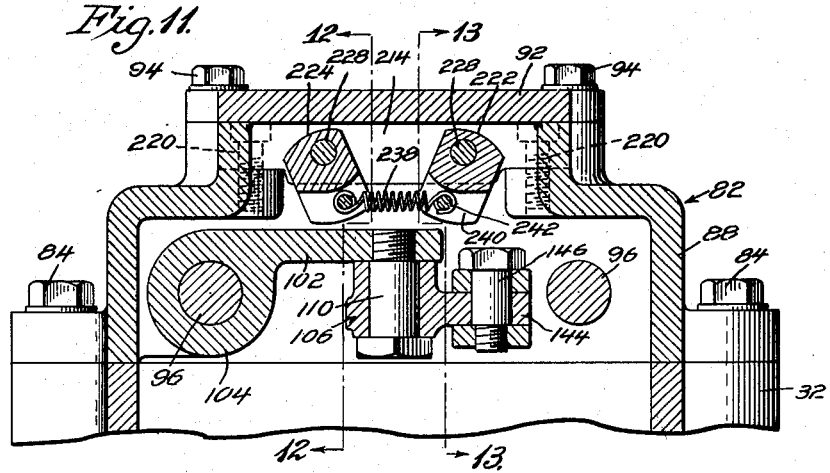
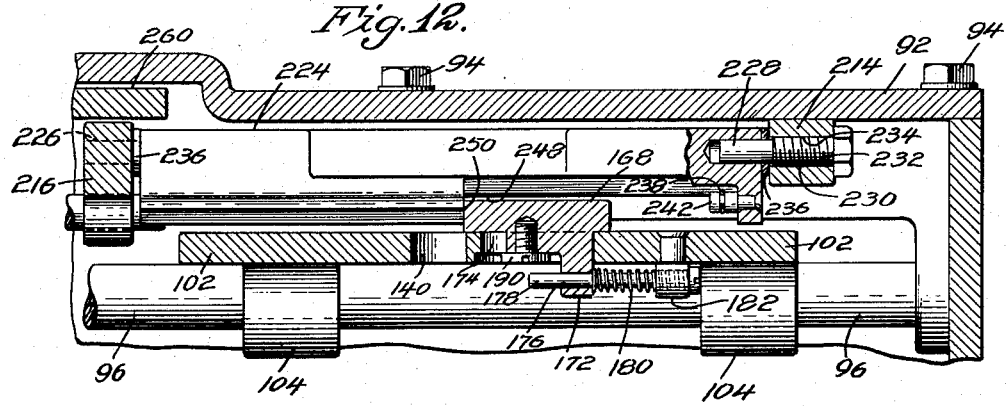
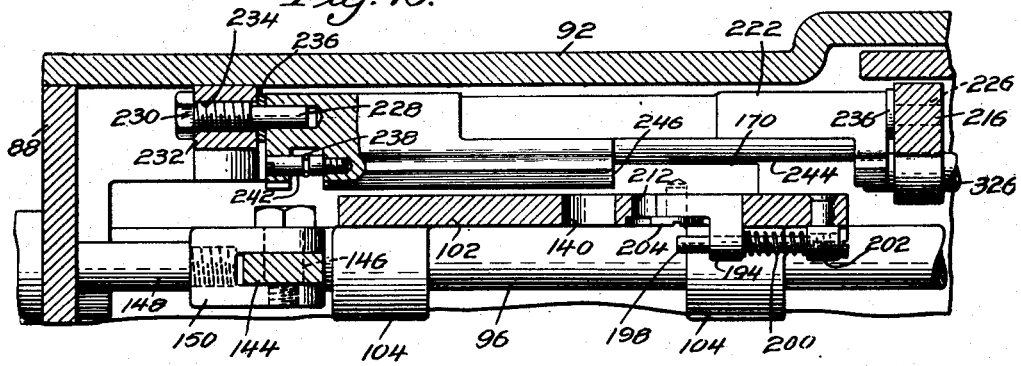
Joshua C. Weaver
INVENTOR
BY Victor J. Evans & Co.
HIS ATTORNEYS June 27, 1939.    J. C. WEAVER    2,163,741
GEAR SHIFTING MECHANISM
Filed Aug. 21, 1936    8 Sheets-Sheet 7
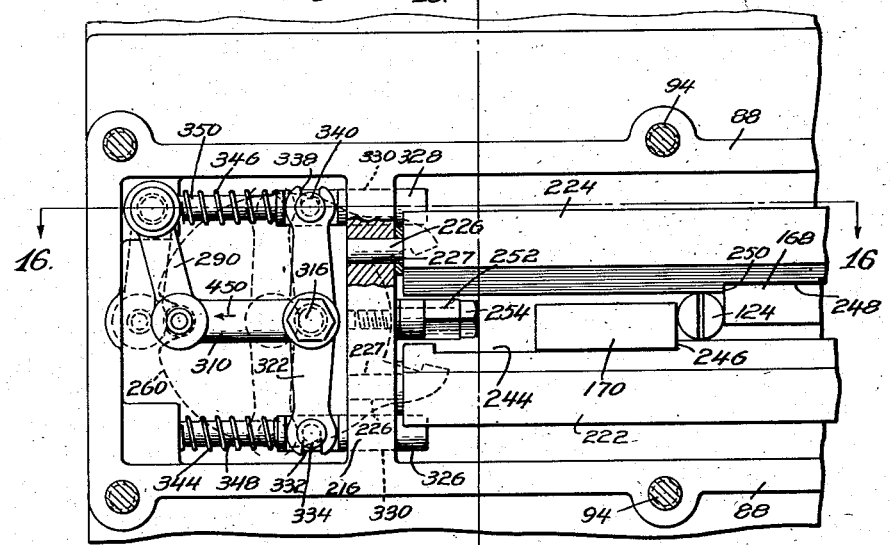
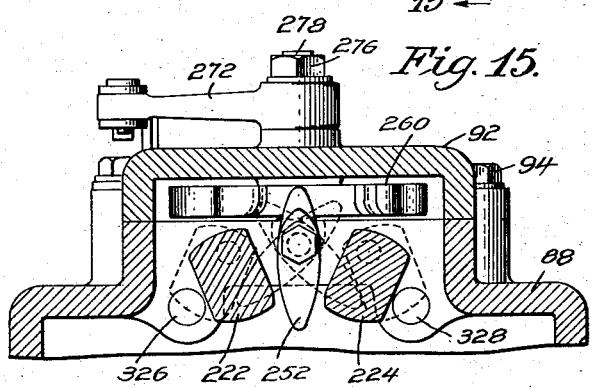
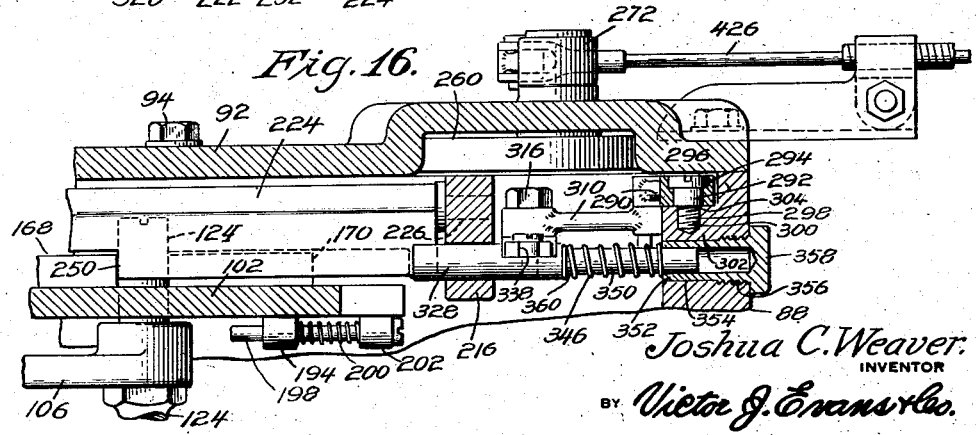
Joshua C. Weaver, INVENTOR
BY Victor J. Evans & Co.
HIS ATTORNEYS

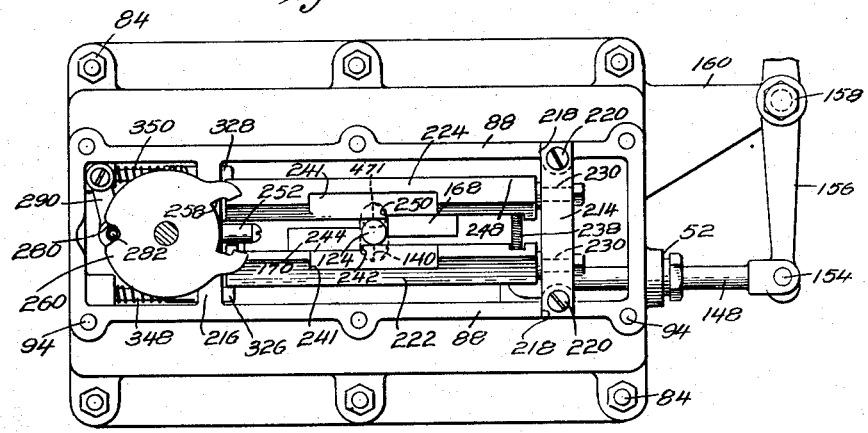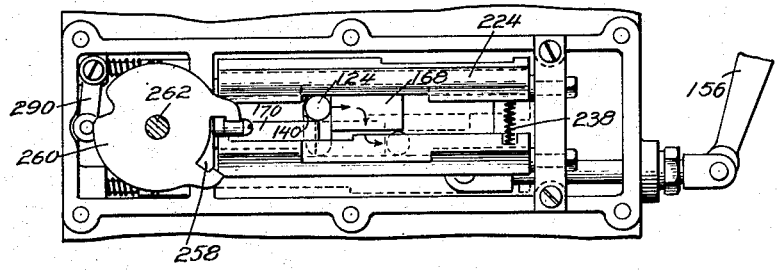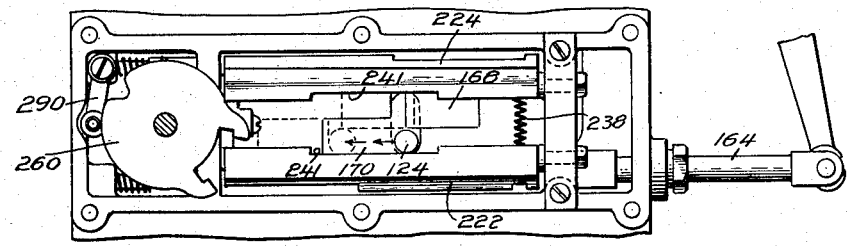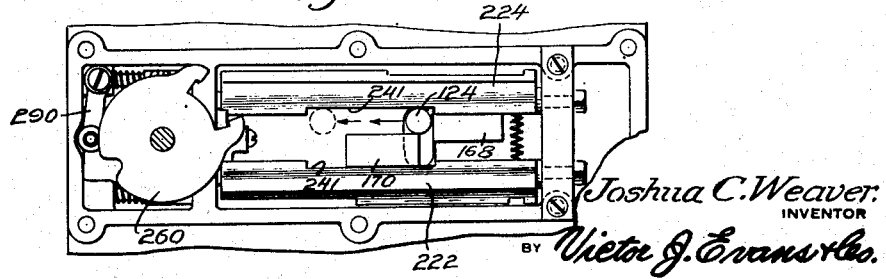

Patented June 27, 1939

2,163,741

UNITED STATES PATENT OFFICE 2,163,741

GEAR SHIFTING MECHANISM

Joshua C. Weaver, Chicago, Ill.

Application August 21, 1936, Serial No. 97,258

5 Claims. (Cl. 74—334)

My invention relates to automotive vehicles, and has among its objects and advantages the provision of an improved mechanical gear shifting mechanism.

In the accompanying drawings:

Fig. 1 is a side elevation of a conventional transmission partly in section, illustrating my invention applied thereto;

Fig. 2 is a top plan view taken from the position indicated by line 2—2 of Fig. 1;

Fig. 3 is a view taken from the position indicated by line 3—3 of Fig. 1;

Fig. 4 is an elevational view taken from the position indicated by line 4—4 of Fig. 1;

Fig. 5 is a sectional view taken along the line 5—5 of Fig. 1;

Fig. 6 is a sectional view taken along the line 6—6 of Fig. 5;

Fig. 7 is an enlarged view taken along the line 7—7 of Fig. 6;

Fig. 8 is a sectional view taken along the line 8—8 of Fig. 7;

Fig. 11 is a sectional view along the line 11—11 of Fig. 7;

Fig. 12 is a sectional view along the line 12—12 of Fig. 11;

Fig. 13 is a sectional view along the line 13—13 of Fig. 11;

Fig. 14 is a sectional view along the line 14—14 of Fig. 10;

Fig. 15 is a sectional view along the line 15—15 of Fig. 14;

Fig. 16 is a sectional view along the line 16—16 of Fig. 14;

Fig. 17 is a top plan view of the gear shift means with the cover removed;

Fig. 18 is a view similar to Fig. 17 illustrating the mechanism in a different position;

Fig. 19 is a view similar to Fig. 17 illustrating a different degree of adjustment; and Fig. 20 illustrates a further degree of adjustment.

Transmission

Figure 9:
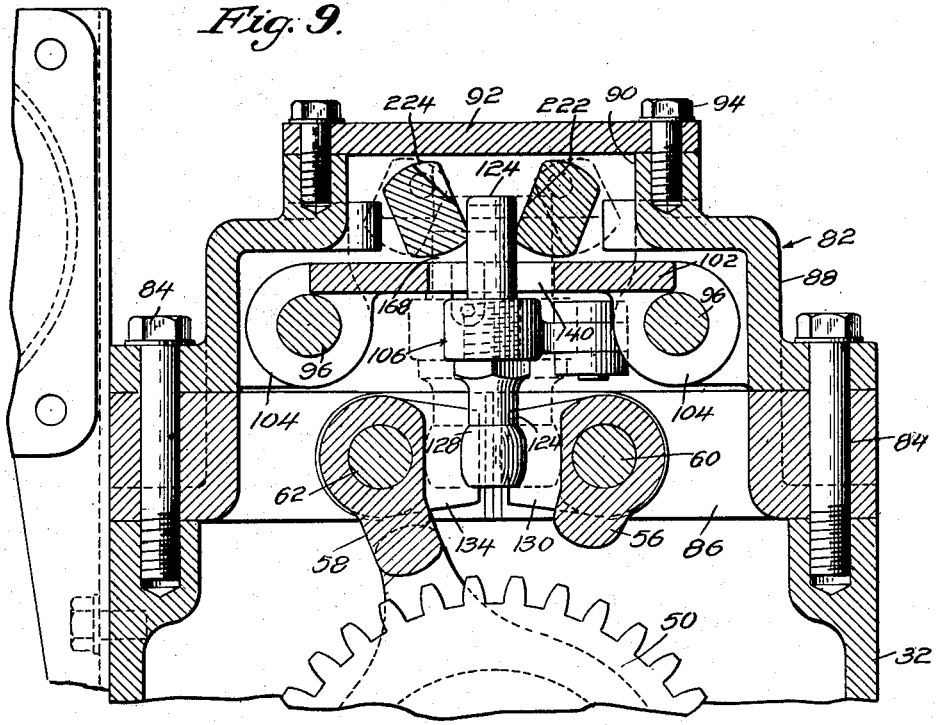
Fig. 9 is a sectional view along the line 9—9 of Fig. 7.

In the embodiment selected to illustrate my invention, I make use of a conventional transmission 30 comprising the usual case 32. The case 32 carries the splined shaft 34 and the countershaft 36. The countershaft 36 carries a plurality of gears 38, 40, 42, and 44, all of which rotate as a unit. Gear 38 is in mesh with the gear 46 driven by the clutch in the usual manner.

Gear 40 is in mesh with the gear 48 mounted upon the splined shaft 34, while the latter carries a gear 50. The gear 50 is arranged to be moved into mesh with the gear 42 or the idle gear 52 (see Fig. 5) which is arranged in mesh with the gear 44.

A synchromesh unit 54 is mounted upon the splined shaft 34 and is arranged to be moved longitudinally thereof through the medium of a shifter fork 56. Movement of the unit 54 in the direction of the gear 46 causes the latter to lock with the unit for driving the splined shaft 34 in high speed. Shifting of the unit 54 in the direction of the gear 48 causes the unit and that gear to lock, whereby the splined shaft 34 is keyed to the gear 48 and driven through the medium of the gears 38 and 40 for operating the shaft 34 at second speed.

Gear 50 is associated with a shifter fork 58 for shifting the gear longitudinally of the splined shaft 34. Gear 50 may be moved into mesh with the gear 42 for operating the splined shaft 34 at low speed. Shifting the gear 50 into mesh with the gear 52 reverses the direction of rotation of the shaft 34 for reversing the vehicle. All the gears so far described and the synchromesh unit 54, as well as the shifter forks, are standard equipment and need not be described in further detail.

Shifter fork 56 is fixedly connected with a shifter rod 60, while the shifter fork 58 is fixedly connected with a shifter rod 62 (see Fig. 6). Both shifter rods 60 and 62 are slidably mounted within openings 64 in supports 66 and 68 carried by the transmission case 32 in the usual way. Support 66 includes a bore 70 loosely supporting latch elements 72 and 74 having ends arranged to project into the recesses 76 and 78 in the shifter rods 60 and 62, respectively. Latch elements 72 and 74 are urged in the direction of the shifter rods 60 and 62, respectively, by a spring 80 housed within the bores of the elements.

In Fig. 6, I illustrate the latch elements 72 and 74 as being arranged in slightly spaced relation, the spacing being such as to bring the elements into abutting relation for holding one of the elements in latching relation with its respective shifter rod while the other shifter rod is being shifted. Latch elements 72 and 74 yield against the tension of the spring 80 through mere shifting of their respective shifter rods 60 and 62. This structure is standard equipment.

Gear changing mechanism

Referring to Figs. 5, 7, and 9, the principal parts of my speed changing mechanism are housed within a cover structure 82 mounted upon the transmission case 32 by bolts 84. The cover structure 82 comprises a wall 86 corresponding to the base of the conventional transmission cover, which wall carries the supports 66. Upon the wall 86 I mount a box 88 having an opening 90 closed by a plate 92 secured to the box by bolts 94.

Within the box 88 I mount two parallel supporting rods 96. The ends of the rods are anchored in openings 98 in the ends of the box and the rods may be made secure by pins 100 (see Fig. 8). Upon the supporting rods 96 I slidably mount a carrier plate 102 having extensions 104 bored to loosely receive the supporting rods 96. Thus, the carrier plate 102 may be shifted longitudinally of the supporting rods.

Referring to Figs. 7 and 8, I mount a bell crank 106 on the carrier plate 102. The bell crank is provided with a bore 108 for loosely receiving a mounting pin 110 having a head 112 which holds the bell crank in close relation with the carrier plate 102. The pin 110 includes a threaded neck 114 anchored in the threaded opening 116 in the carrier plate. Bell crank 106 may be rotated about the pin 110.

The reach 118 of the bell crank includes a threaded opening 120 for receiving the threaded portion 122 of a shifting pin 124. This pin includes a flange 126 which bears against the reach 118 and acts as a lock nut when the threaded portion is screwed down. The lower end of the shifting pin 124 carries a head 128 which is positioned in operative relation with the shifter forks 56 and 58.

Referring to Fig. 6, the shifter fork 56 carries two spaced flanges 130 defining a slot 132 for the reception of the head 128 for shifting purposes. Similarly, the shifter fork 58 carries two flanges 134 which define a slot 136 for receiving the head 128 in the same way as the slot 132. The slots 132 and 136 and the head 128 are conventional so far as construction and operation are concerned.

The pin 124 is mechanically actuated for gear shifting purposes. In Fig. 7, the pin 124 projects through a slot 140 in the carrier plate 102. A slot 142 may be provided in the upper end of the pin 124 for the reception of a screw driver to facilitate mounting of the pin with the bell crank 106. Slot 140 is of sufficient length to permit the pin 124 to shift into operative relation with either of the slots 132 or 136.

The reach 144 of the bell crank 106 is pivotally connected at 146 with an actuating shaft 148 through the medium of a coupling element 150. Shaft 148 extends through a packing gland 152 in one end wall of the box 88 and is pivotally connected at its opposite end at 154 (see Fig. 2) with a lever 156 pivotally mounted at 158 upon a suitable bracket 160 carried by the box 88. The opposite end of the lever 156 is pivotally connected at 162 with a piston rod 164 operated by a power unit 166.

Upon the carrier plate 102 I mount two lock members 168 and 170. These members are arranged for limited sliding movement upon the carrier plate. In Fig. 7, the lock member 168 includes a projection 172 extending through a slot 174 in the carrier plate. This extension projects beyond the lower face of the carrier plate and is provided with a bore 176 for loosely receiving a guide pin 178. Guide pin 178 carries a spring 180 which urges the lock member 168 in the direction of the pin 124.

The spring 180 has one end bearing against the extension 172 and its opposite end bearing against a fixed abutment 182. This abutment includes a threaded bore 184 co-operating with the threaded part 186 of the pin 178 for mounting purposes. To prevent separation of the lock member 168 from the carrier plate 102, I make use of a screw 188 having its head 190 bearing against the shoulder 192 of the carrier plate.

The shoulder 192 is formed by recessing the bottom side of the plate, which recess brings the head 190 within the contour of the carrier plate to provide a compact arrangement. The relation between the head 190 and the shoulder 192 is such as to permit free sliding movement of the lock member 168 upon the carrier plate 102.

The lock member 170 is identical in construction with the lock member 168 and includes an extension 194 projecting through the opening 196 in the carrier plate 102. This extension is bored for loosely receiving the pin 198, which pin carries a spring 200 having abutting relation with the extension 194 and a fixed abutment 202 for urging the lock member 170 in the direction of the pin 124. The pin 198 is of the same construction as the pin 178 and is mounted in the same way. The head of the screw 204 holds the lock member 170 in operative relation with the carrier plate 102 in the same way as the screw 188.

Fig. 17 illustrates the relation of the shifting pin 124 to the lock members 168 and 170 in the neutral position of the shifting pin. In the neutral position, the lock members 168 and 170 bear against the shifting pin 124 with a force corresponding to the tension of the springs 180 and 198, but further separation of the lock members is prevented because of the location of the extensions 172 and 194 in the ends of the slots 174 and 196 remote from the pin 124 (see Fig. 7).

The portions of the locking members 168 and 170 lying above the carrier plate 102 are rectangular in configuration and lie in parallel and partly overlapping end-to-end relation so that each extends beyond the vertical axis of the pin 124. In Fig. 7, the locking member 168 includes a shoulder 206 which engages the end 208 of the slot 174 to limit the movement of the locking member in the direction of the pin 124.

Similarly, the locking member 170 includes a shoulder 210 arranged to engage the end 212 of the opening 196 for limiting the movement of the locking member in the direction of the pin 124. Movement of the locking members in opposite directions is limited by engagement of the extension 172 and 194 with the opposite ends of the openings 174 and 196, respectively. Fig. 7 illustrates the neutral position of the shifting pin 124 and its relation to the locking members 168 and 170 at that time.

In Figs. 7 to 17, inclusive, I illustrate the box 88 as being provided with two cross members 214 and 216. The member 216 may be formed integrally with the side walls of the box 88 and its upper surface terminates flush with the side walls. The side walls may be recessed at 218 for receiving the cross member 214 which is attached to the walls by screws 220 (see Figs. 7 and 11). Two latch bars 222 and 224 are pivotally carried by the cross members 214 and 216. Each latch bar includes a trunnion 226 loosely positioned within an opening 227 in the cross member 216 (see Fig. 14). The opposite ends of the latch bars are bored to loosely receive pivots 228 carried by the cross member 214 (see Figs. 12 and 17).

In Figs. 12 and 13, I illustrate the pivots 228 as comprising extensions of bolts 230 having threaded reaches 232 anchored in the threaded openings 234 in the cross member 214. Washers 236 may be positioned between the cross members and the ends of the latch bars 222 and 224. Washers of different thickness may be substituted to provide precise adjustment longitudinally for the latch bars.

Both latch bars 222 and 224 are mounted to rotate about the trunnions 226 and the pivots 228 and are normally drawn together by a spring 238 (see Figs. 11 and 17). The spring is preferably located at the ends of the latch bars 222 and 224 abutting the cross member 214, and the latch bars may be slotted at 240 (see Fig. 11) and provided with pins 242 over which the ends of the spring are hooked. The upper end of the shifting pin 124 extends to a position between the latch bars 222 and 224. Both latch bars are recessed at 241 to accommodate the shifting pin 124 when the latch bars are pivoted to the dotted line illustration of Fig. 9.

Referring to Fig. 9, the lower edges of the latch bars 222 and 224 terminate in close relation with the top surface of the carrier plate 102 and are arranged to swing into the path of the lock members 168 and 170. The latch bar 222 is recessed at 244 for accommodating the lock member 170 during certain adjustments of the shifting pin 124 (see Fig. 13) and to have abutting relation with the lock member as at 246. The recess 244 is somewhat longer than the lock member 170 to permit relative movement of the lock member within the recess.

When the lock member 170 has been shifted sufficiently far to properly align with the recess 244, the spring 238 will swing the latch bar 222 about its pivots in the direction of the shifting pin 124.

Similarly, the latch bar 224 includes a recess 248 to accommodate the locking member 168 when the two are aligned, at which time the spring 238 will move the latch bar 224 in the direction of the shifting pin 124 (see Fig. 12). Abutting relation may be established between the locking member 168 and one end of the recess, as indicated at 250.

Fig. 17 illustrates the neutral position of the shifting pin 124, while Fig. 18 illustrates the shifting pin 124 at low speed adjustment of the transmission gears. The dotted line position of the shifting pin 124 in Fig. 18 represents second speed adjustment of the transmission gears. Fig. 19 illustrates the shifting pin 124 positioned in second speed adjustment, while Fig. 20 indicates the shifting pin 124 in reverse adjustment of the gears. In Fig. 19, the dotted line position of the shifting pin 124 represents the high speed adjustment of the gears.

On one side of the support 216 I mount a control lever 252. This lever is loosely mounted on a bolt 254 having threaded relation at 256 with the support 216. The lower end of this lever terminates in close relation with the carrier plate 102 and is positioned between the two latch bars 222 and 224. The opposite end of the control lever operates within a slot 258 in a selector 260 having a shaft 262 rotatably mounted in the opening 264 in the cover 92.

One face of the selector operates against the boss 266 to prevent axial movement of the shaft in one direction while the square end 268 of the shaft is anchored in the square opening 270 in one end of a lever 272. The lever abuts the boss 274 to prevent axial movement of the shaft 262 in the opposite direction.

A nut 276 has threaded relation with the shaft 262 at 278 for holding the parts in assembled relation. The shaft 262 may be rotated within the opening 268 through the medium of the crank 272. In the periphery of the selector 260 opposite the recess 258 I provide a second recess 280 in which a pin 282 operates. This pin may be provided with a bushing 284 having free rolling action on the pin (see Fig. 7).

The pin 282 includes a threaded reach 286 having threaded relation with the opening 288 in one end of a link 290 (see Figs. 7 and 14). The opposite end of the link 290 is pivotally mounted upon a bolt 292 (see Figs. 14 and 16). In Fig. 16, the link 290 is recessed at 294 to receive the head 296 of the bolt, and the latter has a reduced threaded extension 298 anchored in the opening 300 in a lug 302 cast integrally with the box 88. The shoulder 304 of the bolt 292 provides an abutment which locks the bolt in position to permit free pivotal action of the link 290.

In Fig. 7, the pin 282 includes a reach 306 loosely mounted in an opening 308 in one end of a link 310. The reach 306 is larger in diameter than the threaded portion 286 to provide a shoulder 312 which has abutting relation with the link 290 so as to insure free pivotal action of the link 310. The opposite end of the link includes an opening 314 which loosely receives a bolt 316 having a reduced threaded extension 318 anchored in the threaded opening 320 in a cross link 322 (see Figs. 7 and 14). The bolt 316 includes a shoulder 324 which is drawn tightly against the cross link 322 to provide free action for the link 310.

Fig. 14 illustrates two latch bar stops 326 and 328 associated with the cross link 322. These latch bar stops project loosely through openings 330 in the support 216 and extend beyond the support a sufficient distance to engage the outer sides of the latch bars 222 and 224, respectively. I arrange the latch bar stops 326 and 328 in holding relation with the outer lower edge of the latch bars 222 and 224 to prevent outward pivotal movement of the latch bars. The latch bar stops may be individually retracted or retracted as a unit out of holding relation with the latch bars 222 and 224 through the medium of the cross link 322.

Figure 10:
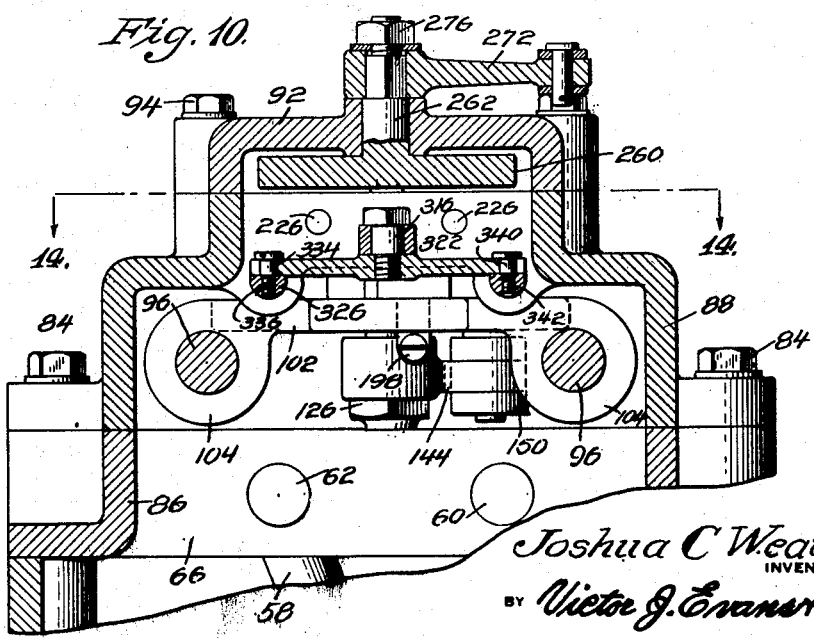
Fig. 10 is a sectional view along the line 10—10 of Fig. 7.

In Fig. 14, one end of the cross link 322 includes a slot 332 for loosely receiving the bolt 334 having threaded anchorage at 336 with the latch bar stop 326 (see Figs. 10 and 14). Thus, the end of the cross link 322 has free pivotal action about the bolt 334. The slot 332 provides free pivotal action of the cross link 322 with respect to the bolt 334. Similarly, the opposite end of the cross link 322 is slotted at 338 to freely receive the bolt 340 having threaded anchorage at 342 in the latch bar stop 328. Thus, the cross link 322 is movably related to the latch bar stops 326 and 328 so that these bars may be moved longitudinally through the pivotal action of the cross link.

Springs 344 and 346 are mounted on the reduced reaches 348 and 350, respectively, of the latch bar stops 326 and 328. One end of the spring 346 is arranged in abutting relation with a sleeve 352 (see Fig. 16) in which the reduced reach 350 is slidably supported. The sleeve is supported within an opening 354 in the box 88 and has threaded relation at 356 with the threaded part of the opening for fastening purposes. This sleeve may be provided with a head 358 for the reception of a wrench for placement and removal purposes. The opposite end of the spring 346 bears against the shoulder 360 of the latch bar stop 328 for urging the stop in the direction of the latch bar 224.

In Fig. 8, I illustrate the box 88 as being provided with a sleeve 362 for slidably supporting the reduced reach 348 of the latch bar stop 326. The spring 344 has abutting relation with the sleeve 362 and the shoulder 364 of the latch bar stop 326 in the same way that the spring 346 is related to the latch bar stop 328. Sleeve 362 is identical in construction with the sleeve 352. Spring 344 urges the latch bar stop 326 inwardly of the latch bar 222.

*Manual control*

In Figs. 1, 2, and 6, I illustrate the manually actuated means for setting the mechanical gear shifting mechanism in operation for shifting gears. The power unit 166 comprises a cylinder 366 which houses the double acting piston 368 connected with the shaft 164. Fig. 6 illustrates the position of the piston 368 in the neutral adjustment of the gears. A conduit 370 is connected with the end 372 of the cylinder 366 and communicates with the chamber 374 of the cylinder.

A second conduit 376 is connected with the end 378 of the cylinder and communicates with the chamber 380. Conduits 370 and 376 are connected with a valve 382 anchored to the box 88 by two of the bolts 84. The power unit 166 is mounted on brackets 384 bolted at 386 to one side of the transmission case 32 (see Figs. 2 and 4.)

A third conduit 388 is connected with the valve 382 and leads to a valve 390 carried by a bracket 392 bolted at 394 to the engine 396 which operates the transmission mechanism. Valve 390 is operatively connected with the intake manifold 398 by a conduit 400. Valve 390 includes a plunger 402 operatively connected with the clutch pedal 404 by a link 406. One end of the link is pivotally connected with the clutch lever while the opopsite end is pivotally connected with the plunger 402. In Fig. 6, I illustrate the valve 382 as including a lower chamber 408 within which a valve blade 410 operates. This valve blade is wedge-shaped when viewed according to Fig. 6, and may be rotated within the chamber 408 through the medium of a shaft 412 fixedly connected with a lever 414 positioned exteriorly of the valve (see Fig. 2).

The lever 414 is connected with the wire 416 slidably housed within the coil wire casing 418. Devices of this nature are old in the art and need not be described in further detail. The opposite end of the wire 416 is connected with a rod 420 mounted for adjustment within the tube 422. The rod 420 and the tube 422 may be of the same construction as employed in various types of carburetor choke controls. Thus, the valve blade 410 may be adjusted to various positions through the shifting of the wire 416. Rod 420 carries a button 424 to facilitate an effective grip for adjustment purposes.

The lever 272 which is connected with the selector 260 is connected with a wire 426 slidably housed within a coil wire tube 428 supported by a bracket 430 at one end and upon a bracket 432 at its opposite end. Wire 426 is connected with a bell crank 434 pivotally mounted at 436 upon the bracket 432. The reach 438 of the bell crank extends through a slot 440 in the instrument panel 442 and constitutes a manually accessible lever for shifting the wire 426 to adjust the selector 260.

*Operation*

In Fig. 1, the full line illustration of the clutch pedal 404 represents the engaged adjustment of the clutch, at which time the plunger 402 is withdrawn to bring the opening 444 out of registration with the conduits 388 and 400 to cut off communication between the intake manifold 398 and the valve 382. When the clutch pedal 404 is depressed to its dotted line position for disengaging the clutch, the plunger 402 is shifted to a position where the opening 444 establishes communication between the intake manifold and the valve 382.

In the neutral position of the shifting pin 124, the lever 438 is positioned in alignment with the designation 446 on the instrument panel 442. In such adjustment of the lever 438, the selector 260 is positioned according to Fig. 17, at which time the pin 282 is positioned within the recess 280. At this time the latch bar stops 326 and 328 extend beyond the support 216 and bear against the outer sides of the latch bars 222 and 224 (see Figs. 14, 15, and 17).

Control lever 252 is positioned according to Fig. 15, with its upper end positioned within the recess 258 of the selector and its lower end positioned between the latch bars 222 and 224. Fig. 14 illustrates the selector 260 removed for the sake of clearness, but the outline of the selector is indicated in dotted lines for illustrating its relation to the latch bar stops 326 and 328 and the linkage connecting these stops with the selector.

With the latch bars 222 and 224 adjusted according to Figs. 14, 15, and 17, the lock members 168 and 170 lie within the recesses 244 and 248 of the latch bars 222 and 224, respectively, and have abutting relation with one end of their respective recesses 244 and 248, as indicated at 246 and 250 (see Figs. 12 and 13). Fig. 17 illustrates the relation of the shifting pin 124 to the stop members 168 and 170 at this time. Spring 238 holds the latch bars 222 and 224 against the shifting pin 124, and the latch bar stops 326 and 328 extend inwardly of the outer sides of the latch bars 222 and 224 so as to restrain the latch bars from pivotal action away from the shifting pin 124.

In the neutral position of the shifting pin 124, the lock members 168 and 170 have abutting relation with the ends of the recesses 174 and 212 remote from the shifting pin so as to be restrained from further separation with respect to the shifting pin 124 (see Fig. 7). Thus, the stop members 168 and 170 are in a sense locked to the carrier plate 102 in that they are restrained from movement in one direction by the shifting pin 124 and in the other direction by engagement with the ends of their respective recesses. In this way, the shifting pin 124 is restrained from movement in any direction so that the shifter forks 56 and 58 are firmly supported to their neutral positions. Abutting relation between the lock members 168 and 170, as indicated at 246 and 250, respectively, prevents relative shifting of the carrier plate 102 with respect to the latch bars.

Adjustment from Neutral to Low Speed

Preparatory to shifting the transmission gears into low speed, the lever 438 is moved downwardly to align with the designation 448 on the instrument board 442 (see Fig. 3). In moving the lever 438 to the designation 448, a pull is exerted on the wire 426 which pulls the lever 272 for rotating the selector 260 to the position of Fig. 18. In rotating the selector 260, the pin 282 is cammed out of the recess 280, which imparts a pivotal movement to the link 290. Such shifting of the link 290 moves the link 310 in the direction of the arrow 450 (see Fig. 14). Such movement of the link 310 retracts the latch bar stops 326 and 328 against the tension of the springs 344 and 346, respectively, through the medium of the cross link 322. With the latch bar stops 326 and 328 moved in the clear of the latch bars 222 and 224, the latter are pivoted away from the shifting pin 124.

The button 424 is now pushed inwardly to the dotted line position 452 of Fig. 1, which shifts the lever 414 in a counterclockwise direction when viewing Fig. 2. Such shifting of the lever 414 rotates the valve blade 410 in the direction of the arrow 454 (see Fig. 6), to the dotted line position 456 for uncovering the port 458 which communicates with the conduit 388. The port 360 which communicates with the conduit 370 remains uncovered so that communication is established between the intake manifold 398 and the chamber 374 of the power unit 166 when the clutch pedal 404 is depressed for bringing the opening 444 in the plunger 402 into alignment with the conduits 388 and 400.

Referring to Fig. 6, with the valve blade 410 in the position 456, the port 462 communicating with the conduit 376 remains uncovered so that communication is established between the chamber 380 of the power unit 166 and the atmosphere through the medium of a port 464, but the valve blade is so positioned as to cut off communication between the port 460 and the atmosphere. In the full line position of the valve blade 410 in Fig. 6, both chambers 374 and 380 communicate with the atmosphere.

I provide the port 464 with a regulating valve 466 including an adjusting screw 468 which may be adjusted to modify the degree of atmospheric communication. The regulating valve 466 functions as an air bleed to permit free shifting of the piston 368 in either direction when communication is established between either of the chambers 374 and 380 and the intake manifold 398. As soon as the chamber 374 has been placed in communication with the intake manifold 398 by depressing the clutch pedal 404, the piston 368 is shifted in the direction of the arrow 470, which moves the shaft 148 inwardly through the medium of the lever 156.

The inner end of the shaft 148 in being pivotally connected with the reach 144 of the bell crank 106 (see Fig. 8) imparts a pivotal action thereto which causes the shifting pin 124 to move against the latch bar 224 and pivot it to the dotted line position of Fig. 9, at which time the latch bar 224 is shifted out of abutting relation with the lock member 168.

In moving the shifting pin 124 to the dotted line position 471 of Fig. 17, the pin has travelled to one end of the slot 140 to be restrained from further lateral movement. In shifting the pin 124 to the dotted line position 471 of Fig. 17, the head 128 of the shifting pin has been moved into the recess 136.

Since the shifting pin 124 has been moved in the clear of the locking member 170, further inward movement of the shaft 148 advances the carrier plate 102 in the direction of the selector 260. As the carrier plate advances, the shifting fork 58 moves the gear 50 into mesh with the gear 42, which brings the gears into low speed adjustment.

After the pin 124 has been shifted to the dotted line position 471, of Fig. 17, movement of the carrier plate 102 in the direction of the selector 260 permits the spring 200 to advance the lock member 170 partly over the shifting pin 124 so as to prevent shifting of the pin within the slot 140. Thus, the shifting pin is restrained from lateral movement in either direction by the lock member 170 and one end of the slot 140. Fig. 18 illustrates the low speed adjustment of the parts.

Shifting from first to second

With the shifting pin 124 adjusted to the full line position of Fig. 18, shifting gears to second speed is attained by merely pulling the button 424 outwardly to the dotted line position 472 of Fig. 1. In pulling the wire 416 in this direction, valve blade 410 is rotated in the direction of the arrow 474 and shifted to the dotted line position 476 (see Fig. 6). Such adjustment of the valve blade establishes communication between the conduits 376 and 388, whereby the piston 368 is moved in the direction of the arrow 478 when the clutch pedal 404 is depressed. Such movement of the piston 368 exerts a pull on the reach 144 of the bell crank 106.

Pulling forces on the bell crank with the shifting pin 124 positioned according to Fig. 18 are prevented from imparting a pivotal action to the bell crank since the shifting pin is held against lateral movement by reason of the locking member 170. Thus, the forces exerted on the bell crank pull the carrier plate 102 in a direction away from the selector 260. During such movement of the carrier plate 102, the gear 50 is moved out of mesh with the gear 42, and the locking member 170 is brought into abutting relation with the abutment 246 on the latch bar 222.

Continued movement of the carrier plate 102 shifts the locking member 170 relatively to the carrier plate by depressing the spring 198 of Fig. 7 until the extension 194 has reached the limits of the slot 196, which stops further movement of the carrier plate. The abutment 246 shifts the locking member 170 out of holding relation with the shifting pin 124 so as to permit the latter to move laterally to the other end of the slot 140 because of the pull on the bell crank.

As the pin 124 shifts to the other end of the slot, the latch member 222 is pivoted out of holding relation with the locking member 170. As the pin takes a position in the other end of the slot, the pin is brought out of abutting relation with the end of the locking member 168, which locking member is aligned with the recess 248 in the latch bar 224 so that the latter is pivoted inwardly in the direction of the pin 124 because of the spring 238. After the latch bar 222 is moved out of abutting relation with the locking member 170 and the pin 124 is moved out of abutting relation with the locking member 168, the carrier plate 102 is free to continue its movement.

As the carrier plate advances, the locking member 168 is urged forwardly by the spring 180 to extend the locking member 168 partly over the shifting pin 124 for restraining the latter against any shifting action within the slot 140. As the carrier plate 102 advances, the shifting fork 56 is moved for connecting the synchromesh unit 54 with the gear 48, thus consummating shifting of the gears into second speed. Fig. 19 illustrates the second speed adjustment.

Shifting from second speed to third speed

In shifting from second speed to third, or high speed, the lever 348 is shifted into alignment with the designation 480 of Fig. 3, which pulls the wire 426 and rotates the selector 260 to the position of Fig. 19. In this adjustment of the selector 260, the lock bar stops 326 and 328 are held in the retracted position while the control lever 252 is pivoted so as to swing its lower end against the latch bar 224 and pivot the same to the dotted line position of Fig. 15. The button 424 is pushed inwardly, as indicated by the designation 482 of Fig. 3, and as illustrated in the position 452 of Fig. 1.

Adjustment of the button 424 shifts the valve blade 410 to the 456 position of Fig. 6, at which time the piston 368 moves in the direction of the arrow 470, which causes the carrier plate 102 to be advanced in the direction of the selector 260. Since the lock member 168 extends partly over the shifting pin 124 in the position of Fig. 19, the bell crank 106 is restrained from pivotal movement. Thus, when the shaft 148 is pushed inwardly, the carrier plate 102 will advance in the direction of the selector 260.

During such advancement of the carrier plate, the latch bar 224 is held in the clear of the lock member 168 by the control lever 252, which permits the shifting fork 56 to move the synchromesh unit 54 away from the gear 48 and into connecting relation with the gear 46 for consummating the high speed adjustment. Fig. 19 illustrates in dotted lines the position of the pin 124 in its high speed adjustment.

Changing from high speed to second speed

In changing from high speed to second speed, the button 424 is pulled outwardly to the 472 position of Fig. 1 for adjusting the valve blade 410 to the 476 position of Fig. 6. The clutch is then depressed for establishing communication between the intake manifold and the chamber 380. Movement of the piston 368 in the direction of the arrow 478 pulls the carrier plate 102 in a direction away from the selector 260, which in turn moves the synchromesh unit 54 out of connected relation with the gear 46 and into connected relation with the gear 48.

Changing from second speed to first speed

To shift from second speed to first, the lever 438 is moved into alignment with the designation 448, which adjusts the selector 260 to the position of Fig. 18. Such adjustment of the selector brings the control lever 252 out of holding relation with the latch bar 224, thus permitting the latch bar to pivot inwardly to bring the abutment 250 into the path of the locking member 168, which causes the bell crank 106 to pivot during advancement of the carrier plate for moving the shifting pin 124 out of abutting relation with the lock member 170. As the shifting pin 124 pivots the latch bar 224 outwardly out of holding relation with the lock member 168, the carrier plate may be advanced to bring the shifting pin to the full line position of Fig. 18. In this position, the gear 50 is brought into mesh with the gear 42.

Shifting from first speed to reverse

To shift from first to reverse the lever 438 is moved to the designation 484 of Fig. 3, which moves the selector 260 to the position of Fig. 20. Such adjustment of the selector moves the control lever 252 against the latch bar 222 for moving and holding the same in the dotted line position of Fig. 15. The button 424 is then pulled outwardly to the position 472 of Fig. 1, and the clutch disengaged for establishing communication between the intake manifold 398 and the chamber 478.

In holding the latch bar 222 in the dotted line position of Fig. 15, the lock member 170 is completely in the clear of the latch bar, and the shifting pin 124 will be prevented from shifting laterally so that the carrier plate 102 will be pulled away from the selector 260 for bringing the shifting pin 124 to the full line position of Fig. 20. With the shifting pin 124 positioned according to the full line illustration of Fig. 20, the shifting fork 58 has moved the gear 50 into mesh with the idle gear 52, thus placing the gears in reverse adjustment.

Shifting from reverse to first

Referring to Fig. 20, the full line position of the shifting pin 124 illustrates the transmission in reverse. In changing from reverse to first, the lever 438 remains positioned at the designation 484, and the button 424 is pulled to the 472 position of Fig. 1 and the clutch pedal 404 depressed, whereby the piston 368 moves in the direction of the arrow 470 for advancing the carrier plate 102 in the direction of the selector 260. During such movement of the carrier plate 102, the shifting fork 58 moves the gear 50 out of mesh with the gear 52 and into mesh with the gear 42, which consummates the first speed adjustment.

With the selector 260 adjusted according to Fig. 20, the control lever 252 holds the latch bar 222 in the clear of the locking member 170, while the shifting pin 124 holds the latch bar 224 in the clear of the locking member 168. Thus, shifting from reverse to first is consummated by merely advancing the carrier plate 102.

Shifting from first to neutral

In shifting from first to neutral, the lever 438 is moved to the designation 446 for moving the selector 260 to the position of Fig. 17, at which time the pin 282 falls into the recess 280. When the carrier plate is positioned according to Fig. 18, the locking member 170 is aligned with the recess 244 in the latch bar 222 so that the latch bar is pivoted in the direction of the shifting pin 124 by the spring 238.

As the latch bar 222 pivots inwardly, the latch bar stop 326 is projected inwardly of the latch bar 222 because of the spring 344 so as to restrain pivotal movement of the latch bar in the opposite direction. The button 424 is then pulled outwardly to the 472 position, and the clutch depressed, whereby the piston 368 moves in the direction of the arrow 478 which pulls the carrier plate 102 away from the selector 260. Since the locking member 170 extends partly across the shifting pin 124, the pin is restrained from shifting within the slot 140.

As the carrier plate continues to advance, the locking member 170 engages the abutment 246, which shifts the locking member relatively to the carrier plate for bringing the locking member out of abutting relation with the shifting pin 124 so that the latter may move laterally across the end of the locking member. The lateral movement of the pin 124 is limited because of the locking bar stop 326, which prevents outward pivotal movement of the latch bar 222. Thus, the latch bar 222 is latched so as to stop the shifting pin 124 when it reaches the full line position of Fig. 17.

At this time, the locking member 178 is aligned with the recess 248 in the latch bar 224 so that the latter is pivoted inwardly because of the spring 238. As the latch bar 224 pivots inwardly, the latch bar stop 328 is projected because of the spring 346 so as to prevent pivotal movement of the latch bar away from the shifting pin. Thus, the shifting pin 124 will be positively latched in the full line position of Fig. 17. In moving the shifting pin 124 from the full line position of Fig. 18 to the full line position of Fig. 17, the shifting fork 58 has moved the gear 50 out of mesh with the gear 42 and adjusted the gear to the position of Fig. 1, which is neutral.

Shifting from second to neutral

With the shifting mechanism adjusted according to Fig. 19, which represents second speed, shifting to neutral is attained by moving the lever 438 to the designation 446, which moves the selector 260 to the position of Fig. 17. With the parts adjusted according to Fig. 19, the latch bar 224 is in the full line position of Fig. 15, at which time the latch bar stop 328 extends inwardly of the latch bar and prevents pivotal movement of the latch bar.

The button 424 is pushed to the 452 position of Fig. 1, and the clutch depressed, whereby the piston 368 moves in the direction of the arrow 470 and advances the carrier plate 102 in the direction of the selector 260. As the carrier plate advances, the locking member 178 is moved into engagement with the abutment 250, which shifts the locking member 170 relative to the carrier plate and moves the locking member out of holding relation with the shifting pin to permit the latter to move laterally across the end of the locking member. As the pin 124 shifts across the end of the locking member 168, the latch bar 222 will pivot inwardly, since the locking member 170 has been aligned with the recess 244. As the spring 238 moves the latch bar 222 inwardly, the lock bar stop 326 is projected inwardly of the latch bar. Thus, the shifting pin 124 is latched in the full line position of Fig. 17.

General features

My gear shifting mechanism is designed to be associated with transmissions of conventional construction. The shifting mechanism may be easily attached to the transmission housing, necessitating only the removal of the conventional gear shifting lever. The shifting mechanism is positive in action under all conditions of service and in all adjustments of the transmission. The parts are of durable construction and are so designed as to wear indefinitely. The shifting mechanism is quick and certain in its action when once set in operation.

The power required for operating the shifting mechanism is taken from the engine, while the power unit 166 is so designed as to operate with a minimum amount of power so as not to impair engine efficiency. The lever 338 and the button 424 are conveniently arranged so as to facilitate manipulation. The controls 424 and 438 are designed to permit preselected adjustment thereof so that the shifting mechanism is set in operation when the clutch is disengaged.

The shifting mechanism operates to shift gears while the car is running or standing through the medium of the controls 424 and 438 with the assistance of the clutch pedal 404. In substituting the mechanical shifting mechanism for the manually operated shifting lever, I provide a mechanical shifting action which shifts the gears with such a degree of consistent uniformity as to eliminate clashing of the gears and damage thereto incident to manually actuated devices.

Without further elaboration, the foregoing will so fully explain my invention that others may, by applying current knowledge, readily adapt the same for use under various conditions of service.

I claim:

1. The combination with transmission gears of an automotive vehicle, of a power unit, manually actuated means for setting the power unit in operation, manually actuated means for preselecting the speed adjustment of the transmission gears, a shifting pin operatively connected with the transmission gears for adjusting the same to the preselected speed, a carrier for supporting the shifting pin, means carried by the carrier for controlling the movement of the shifting pin, and an operating connection between the shifting pin and the power unit, said operating connection including a bell crank pivotally mounted on the carrier and connected with the shifting pin including means for latching the bell crank against pivotal movement.

2. The combination with transmission gears of an automotive vehicle, of a power unit, manually actuated means for preselecting the speed adjustment of the transmission gears, manually actuated means for setting the power unit in operation, a pair of shifter rods operatively connected with the transmission gears, a carrier, a shifting pin movably mounted on said carrier for connection with either of the shifter rods, latch bars including resiliently mounted abutments for controlling the movement of the shifting pin, a bell crank connected with the shifting pin, and an operating connection between the bell crank and the power unit.

3. The combination with transmission gears of an automotive vehicle, of a cylinder having a piston movably mounted therein and arranged to divide the cylinder into two chambers, a vacuum line, a valve interposed in said vacuum line for establishing communication with either of said chambers, a clutch, a second valve interposed in said line and operatively connected with the clutch pedal for opening the line, to move the piston, manually actuated means for preselecting the speed adjustment of the transmission gears, shifter rods, a carrier, a shifting pin movably connected with the carrier for an operating connection with either of the shifter rods, means operatively connected with said manually actuated means for controlling the movement of the shifting pin, and an operating connection between the shifting pin and said piston.

4. The combination with transmission gears of an automotive vehicle, of a cylinder having a piston movably mounted therein and arranged to divide the cylinder into two chambers, a vacuum line, a valve interposed in said vacuum line for establishing communication with either of said chambers, a clutch, a second valve interposed in said line and operatively connected with the clutch pedal for opening the line, to move the piston, manually actuated means for preselecting the speed adjustment of the transmission gears, shifter rods, a carrier, a shifting pin movably connected with the carrier for an operating connection with either of the shifter rods, means operatively connected with said manually actuated means for controlling the movement of the shifting pin, and an operating connection between the shifting pin and said piston, said operating connection including a bell crank for moving the shifting pin into operative relation with either of the shifter rods and for moving the carrier and the shifting pin bodily after such connection.

5. The combination with transmission gears of an automotive vehicle, of a power unit, manually-actuated means for setting the power unit in operation, a movable carrier including a support therefor, a shifting element movably related to the movable carrier and adapted to be operatively connected with the transmission gears for adjusting the same, latch bars pivotally mounted on the carrier for pivotal movement about their longitudinal axes, abutments movably related to the movable carrier, said latch bars and said abutments cooperating with said shifting element for controlling the movement thereof, means for controlling the action of the latch bars, and an operating connection between the movable carrier and the power unit including an operating connection with said shifting element for actuating the same as the movable carrier is moved.

JOSHUA C. WEAVER.